United States Patent Office 3,355,960
Patented Dec. 5, 1967

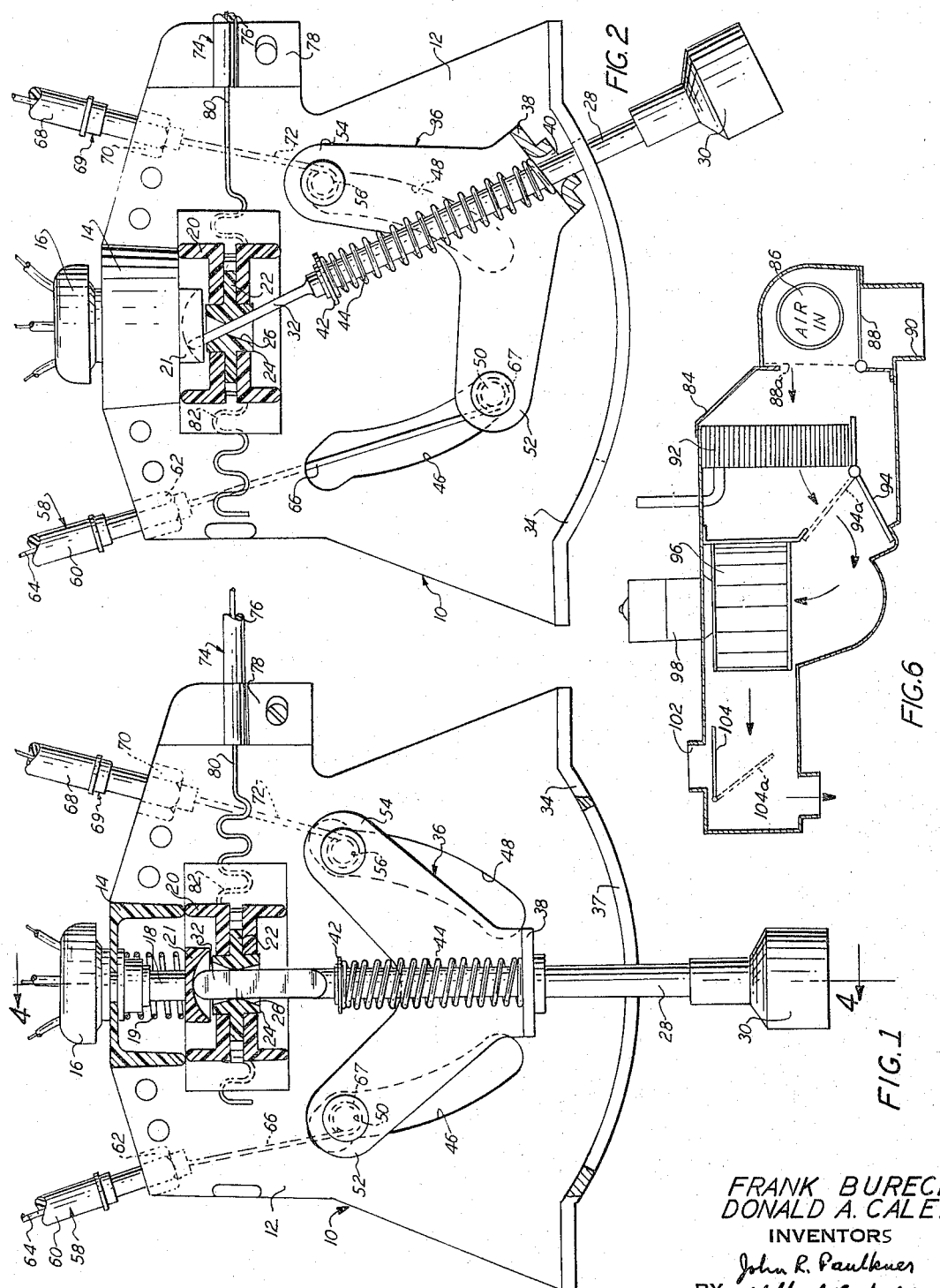

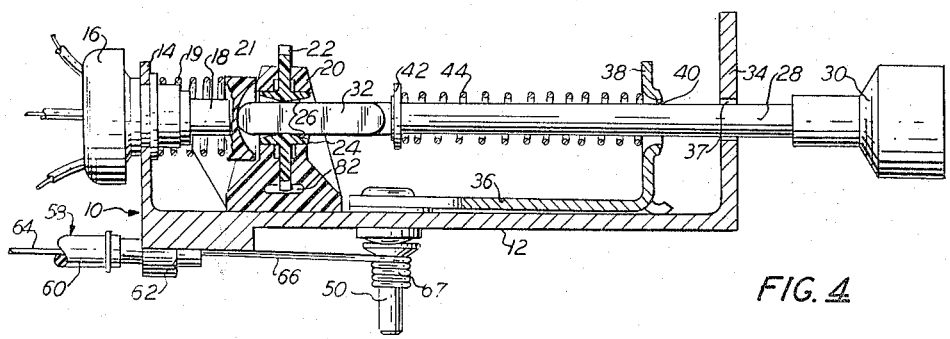

3,355,960
SINGLE KNOB HEATER CONTROL
Frank Bureck, Redford Township, and Donald A. Caley, Dearborn Heights, Mich., assignors to Ford Motor Company, Dearborn, Mich., a corporation of Delaware
Filed Dec. 14, 1965, Ser. No. 513,761
6 Claims. (Cl. 74—471)

The present invention relates generally to control mechanisms for automotive heaters, and more particularly to a control device that performs a variety of functions with a single control knob.

The operator of a motor vehicle is often confused by the plurality of controls provided for regulating the different functions of the automotive heater. Some vehicles provide a first lever for controlling a valve in the heater inlet duct, a second lever for controlling the temperature of air flowing from the heater, a third lever for controlling the flow of air through the defroster outlet, and a fourth lever or switch for controlling the speed of the heater blower motor. In addition to confusing the driver, the variety of controls tends to clutter the instrument panel which is undesirable from a styling standpoint. Still further, the variety of levers and switches presents a significant problem to the automotive designer who must find room on a crowded instrument panel to package the controls.

In view of the problems presented by conventional heater control mechanisms, it is a principal object of the present invention to provide a simplified heater control.

More particularly, it is an object of the present invention to provide a heater control having only a single knob that performs the four functions usually associated with the plurality of controls usually used. The single control knob is actuatable to permit the flow of air into the heater, to regulate the percentage of air flowing through the heater cooler, to control the amount of air exhausted through the defroster outlets and to control the velocity of air exhausting from the heater by *regulating* the speed of the blower motor.

The many objects and advantages of the present invention will become apparent upon consideration of the following description and the accompanying drawings, in which:

FIGURE 1 is a top plan view partly in section of a heater control mechanism with the single control knob in the "heat" position;

FIGURE 2 is a top plan view of the unit of FIGURE 1 showing the control knob moved to the "defrost" position;

FIGURE 3 is a top plan view of the unit of FIGURE 1 showing the control knob moved to the "off" position;

FIGURE 4 is a sectional view taken along section line 4—4 of FIGURE 1;

FIGURE 5 is a front elevational view of the heater control of FIGURE 1; and

FIGURE 6 is a schematic representation of a typical heater with which the control mechanism of FIGURE 1 can be associated.

Referring now to the drawings for a more detailed understanding of the present invention, FIGURE 1 illustrates a heater control constructed in accordance with the presently preferred embodiment of the invention. The heater control of FIGURE 1 includes a housing structure 10 that is molded of plastic material. The housing 10 includes a flat base portion 12 that has a box-like support structure 14 extending vertically therefrom. An electrical switch 16 is secured to the support structure 14. A switching element 18 extends forwardly from the switch 16 and is adapted to trip the switch when it is pushed. The switch 16 is of the sequentially operated type, that is, it moves to its next switching position when the switch element 18 is moved inwardly. Assuming that the switch is in an initially "off" position, when the element 18 is pushed inwardly the switch 16 will be turned to a "low" position. When it is pushed a second time it will be switched to a "high" position, and when it is pushed a third time it will return to its initial off position. A coil spring 19 is interposed behind the enlarged button 21 on the end of the switching element 18 to urge the element 18 forwardly.

A second support structure 20 extends upwardly from the plane of the base portion 12 at a location just forwardly of the structure 14. A pinion gear 22 having an enlarged hub 24 is supported by the structure 18. The pinion gear 22 is provided with a slot 26 having bevelled edges. A control shaft 28 has a knob 30 at its outer end and an inner end 32 that is flattened in the manner of a spatula. The spatula end 32 fits within the slot 26 with sufficient clearance for axial displacement. The tip of the spatula portion 32 contacts the button 21 on the switching element 18. The bevelled slot 26 permits the gear 22 to function as a universal joint and a support for the end 32 of the shaft 28.

An upstanding flange 34 extends from the front edge of the base portion 12. The flange 34 is provided with a lateral slot 36 that supports a portion of the control shaft 28. Control shaft 28 is shiftable by movement of the knob 30 from the left-hand position illustrated in FIGURE 3 to the center position illustrated in FIGURE 1, and from there to the right-hand position illustrated in FIGURE 2. The functions achieved by this movement will be described later.

A cam follower 36 is positioned on top of the base plate 12. The cam follower 36 includes a front vertical flange 38 that is apertured at 40 to receive the shank of the control shaft 28. A snap ring 42 is secured in a groove on the control shaft 28 and is used to locate a coil spring 44 positioned about the control shaft 28. The spring 44 presses against the vertical flange 38 at one end and against the snap ring 42 at the other end. The spring 44 urges the tip of the spatula end 32 into engagement with the switching element 18.

A pair of cam slots 46 and 48 of generally arcuate configuration are provided in the base plate 12. The follower 36 is of bifurcated construction having a pair of arms 52 and 54. Arm 52 overlays the slot 46 and carries a post 50. The post 50 extends downwardly from the arm 52 through the slot 46 and protrudes from the lower surface of base 12. The right-hand arm or branch 54 of the follower 36 extends over the slot 48 and carries a depending post 56 that extends through the cam slot 48.

A Bowden wire assembly 58 has its casing 60 secured to the plate 12 by a clamp 62. A control wire 64 situated within the casing 12 has an extending end 66 that is twisted into a pigtail 67 and slipped onto the post 50.

Similarly, the casing 68 of a Bowden wire assembly 69 is secured to the other side of the plate 12 by a clamp 70. A control wire 72 protrudes from the casing 68 and is secured to the depending post 56 by a pigtail.

A third Bowden wire assembly 74 has its casing 76 secured to the plate 12 by a clamp 78. Control wire 80 situated within the casing 36 is provided with a serpentine end configuration as indicated in drawing FIGURES 1, 2 and 3. The serpentine end 82 is formed by a series of uniplanar loops having transverse portions that are parallel to the axis of the pinion gear 12. The serpentine end 82 of control wire 80 is guided in a slot formed in the support member 20. The gear teeth of the pinion 22 are in driving engagement with the serpentine end 82. The transverse portions of the loops are spaced apart a distance equal to the pitch of the gear teeth. This connection is a driving one so that when the knob 30 is rotated, the control wire 80 will either extend or retract.

The control device illustrated in FIGURES 1 through 5 can be used to control the automotive heater illustrated schematically in FIGURE 6. In FIGURE 6, a passenger car heater 84 is provided with a housing of sheet metal or plastic construction. Cool fresh air enters through the opening 86 situated at the right-hand side of the heater 84. A pivotally mounted door or valve 88 controls whether the fresh air coming through the opening 86 flows through the fresh air outlet 90 or is directed to the left toward a heater core 92. When the valve 88 is in the solid line position, air is directed into the heater. When the valve 88 is in the dotted line position indicated by reference numeral 88a, fresh air coming through the inlet 86 flows directly through the outlet 90 and into the passenger compartment.

The heater core 92 is a heat exchanger and contains flowing warm water from the engine cooling system. A blend air valve 94 is pivotally mounted to move from the full line position shown to the dotted line position 94a. In the full line position, all of the inlet air passes through the heater core 92. When the valve 94 is moved to the position 94a, the inlet air bypasses the heater core. The valve 94 may be moved to an infinite number of intermediate positions to obtain a blending of air passing through the heater core 92 and air bypassing the heater core 92. Thus, valve 94 is a temperature control valve which controls temperature by regulating the percentage of inlet air that passes through the heater core 92.

An impeller wheel 96 is driven by an electric motor 98. Air passing through and around the heater core 92 flows into the center of the impeller wheel 96 and out its periphery toward the left-hand end of the heater housing 84. A heater outlet 100 is situated to exhaust air flowing from the blower 96 into the passenger compartment and preferably in the area of the driver's feet. A second outlet 102 is connected to the defroster outlets situated at the windshield of the vehicle. The defroster outlet 102 is controlled by a valve 104 which is shown in full line position as sealing the outlet. When the valve 104 is moved to the dotted line position 104a, heated air is directed through the defroster outlet 102 to the windshield.

Upon installation of the mechanism of FIGURES 1 through 5, control wire 72 of Bowden wire 68 is connected to the valve 88. When the knob 30 is in the left-hand position, the control wire 72 is pulled by cam follower 36 to the position 88a which seals the inlet to the heater. This arrangement is shown in FIGURE 3. When the knob 30 is moved to the central position of FIGURES 1 and 5, control wire 72 moves the valve 88 to the position where the fresh air outlet 90 is closed, the heater inlet is open, and all of the air coming from the opening 86 travels toward the heater core 92.

Control wire 80 of Bowden wire assembly 74 has its opposite end connected to the blend air door 94. When the knob 30 is rotated, the motion transfer mechanism comprising the pinion gear 44 and serpentine end 82 moves wire 80 inwardly or outwardly to control the position of the door 94 and the percentage of inlet air that passes through the heater core.

Bowden wire assembly 58 has its control wire 64 connected to the valve 104 at the defroster outlet 102. When the knob 30 is in the left-hand position of FIGURE 3 or in the central position of FIGURES 1 and 5, the valve 104 assumes the position illustrated in solid line in FIGURE 6. When the knob 30 is moved to the left-hand position as illustrated in FIGURE 2, the wire 66 is pulled causing the valve 104 to assume the position 104a which, in turn, permits air being expelled by the impeller wheel 96 to exhaust through the defroster outlet 102.

The speed of the blower motor 98 is controlled by the switch 16. The electrical wires extend from the switch 16 connect the motor 98 with the power source. In its initial position, the switch 16 is off and the motor 98 is not running. When the knob 30 is pushed, the switch 16 is cycled to its first stage causing the motor to run at a low speed. When the knob 30 is pushed a second time, the motor 98 runs at high speed. Upon a third movement inwardly of the control knob 30, the motor is shut off by the switch 16.

In summary, the heater assembly of FIGURE 6 has four control elements. The first controls the flow of inlet air. The second regulates the percentage of air flowing through the heater core 92. The third controls air flowing through the defroster outlet 104 and the fourth controls the motor 98. All four of these controls are handled by the single knob 30.

In addition to providing a heater control in which one knob is movable to perform four different functions, the control 10 mechanism is an extremely compact structure permitting automotive engineers and designers greater latitude in positioning and locating the device on the instrument panel of the vehicle. Because there is a single knob, the complexity of the mechanism is reduced and it is simpler to operate.

The foregoing description presents the presently preferred embodiment of this invention. Modifications and alterations may occur to those skilled in the art that will come within the scope and spirit of the following claims.

We claim:
1. A control mechanism comprising:
a control shaft,
a housing having a portion defining a linear path for one end of said control shaft,
an electrical switch connected to said housing and having a switching element engageable by said control shaft,
said switching element being constructed to actuate said switch upon axial movement of said control shaft,
a first motion transfer device engaging said control shaft,
a first actuator connected to said first motion transfer device,
said first motion transfer device being constructed to transfer rotary motion of said control shaft to said first actuator,
a second motion transfer device engaging said control shaft,
second and third mutually independent actuators connected to said second motion transfer device,
said second motion transfer device being constructed to transfer movement of said control shaft along the linear path defined by said housing portion to said second and third actuators.

2. The control mechanism of claim 1 and including:
said switching element engaging the other end of said control shaft,
said control shaft being axially displaceable to actuate said electrical switch,
said first motion transfer device comprising a gear rotatably mounted on said housing,
said gear having a centrally situated slot with bevelled edges,
said other end of said shaft having a spatula configuration and slidably mounted in said slot,
said first actuator comprising a first Bowden wire assembly having an axially movable control wire,
a portion of said housing defining a linear path for the movement of said control wire,
means providing a driving engagement between said control wire and said gear,
said second motion transfer device comprising a follower having an upstanding portion slidably engaging said control shaft,
said housing having a pair of cam slots,
said follower having a pair of extending portions fitted in said slots to guide the movement of said follower, said second actuator comprising a second Bowden wire assembly having a control wire connected to one of said extending portions, said third actuator comprising a third Bowden wire assembly having a control wire connected to the other of said extending portions, the control wires of said first, said second and third Bowden wire assemblies being connected to heater control valves and constructed to move said valves in response to movement of said control shaft, said switch being connected to a heater blower motor and adapted to control the speed of said blower motor.

3. The control mechanism of claim 1 and including:

said first motion transfer device comprising a member mounted on said housing for angular movement, said shaft engaging said member, said first actuator comprising a first Bowden wire assembly having an axially movable control wire, means constructed for providing a driving engagement between said control wire and said member, said second actuator comprising a second Bowden wire assembly having a control wire connected to said second motion transfer device, said third actuator comprising a third Bowden wire assembly having a control wire connected to second motion transfer device.

4. The control mechanism of claim 1 and including:

said switching element engaging the other end of said control shaft, said control shaft being axially displaceable to actuate said electrical switch, said first motion transfer device comprising a member mounted on said housing for angular movement, said other end of said shaft being connected to said member for joint angular movement, said first actuator comprising a first Bowden wire assembly having an axially movable control wire, means constructed for providing a driving engagement between said control wire and said member, said second motion transfer device comprising a follower movably connected to said housing, said second actuator comprising a second Bowden wire assembly having a control wire connected to said follower, said third actuator comprising a third Bowden wire assembly having a control wire connected to said follower.

5. The control mechanism of claim 1 and including:

said switching element engaging the other end of said control shaft, said control shaft being axially displaceable to actuate said electrical switch, said first motion transfer device comprising a member mounted on said housing for angular movement, said other end of said shaft being connected to said member for joint angular movement, said first actuator comprising a first Bowden wire assembly having an axially movable control wire, means constructed for providing a driving engagement between said control wire and said member.

6. The control mechanism of claim 1 and including:

said first motion transfer device comprising a member mounted on said housing for angular movement, said other end of said shaft being connected to said member for joint angular movement, said first actuator comprising a first Bowden wire assembly having an axially movable control wire, means constructed for providing a driving engagement between said control wire and said member.

References Cited

UNITED STATES PATENTS 2,865,220 12/1958 Bayley _____ 74—471
2,912,873 11/1959 Little _____ 74—504 X FRED C. MATTERN, JR., *Primary Examiner.*

C. F. GREEN, *Assistant Examiner.*